April 14, 1959     F. D. FRANTZ, JR     2,882,472
ELECTRICAL CAPACITORS
Filed Nov. 2, 1955
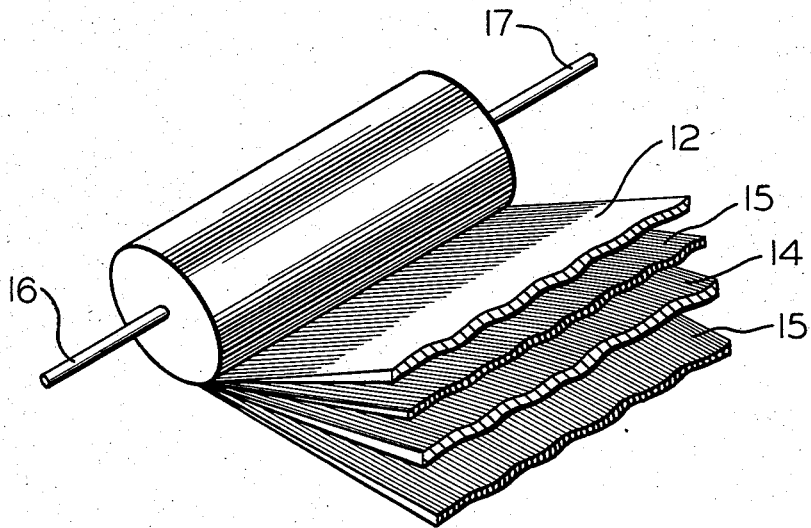
INVENTOR.
FRANKLIN D. FRANTZ JR.
BY Roland A. Dexter
HIS ATTORNEY

United States Patent Office 2,882,472
Patented Apr. 14, 1959

2,882,472

ELECTRICAL CAPACITORS

Franklin D. Frantz, Jr., Woodford, Vt., assignor to Sprague Electric Company, North Adams, Mass., a corporation of Massachusetts Application November 2, 1955, Serial No. 544,529

2 Claims. (Cl. 317—259)

This invention relates to electrical capacitors and more particularly to improved dielectric materials particularly adapted for use as a dielectric in such capacitors, which dielectric material is improved by the addition of a compound of a novel class of stabilizers.

The use of stabilizing agents for dielectric materials for use in capacitors is not new. Various sources of literature show that small additions of certain organic substances to capacitor impregnants have caused marked extension in the life of the components, particularly at elevated temperatures. Material such as the quinones, aromatic azo and azoxy compounds, benzil, acid anhydrides, sulfur and certain unsaturated aliphatic hydrocarbons have been suggested and have found at least limited use for organic dielectric materials. While these aforementioned stabilizing agents do contribute to improved results, they are in no way completely successful. When used in amounts insufficient to deleteriously affect the primary dielectric's electric properties, the period of stabilization is somewhat limited. When large amounts of the stabilizer are employed, either the solubility is found to be insufficient, or the insulation resistance is lowered to an extent sufficient to make the capacitor unusable.

It is an object of this invention to produce new and useful electrical capacitors which may be operated at elevated temperatures for extended periods without failure. Additional objects will become apparent from the following description and claims.

My invention is based on the discovery that certain dyestuff intermediates and oil soluble dyes are especially effective stabilizers for a number of organic dielectrics, including saturated and unsaturated hydrocarbons. In particular, one stabilizer, N,N,N',N'-tetramethyl-4,4' diaminobenzophenone is very effective. It has a complex structure with accompanying low electrical conductivity (low mobility); acid accepting groups (amines, unsaturated groups); aromatic groups; high substitution for increased solubility and reduced polarity. Although the preferred compound is set forth above, numerous other alkyl substituted aminobenzophenone compounds form a class which satisfies the requirements for an effective stabilizer. Therefore, for the full scope of my invention the following compounds come within the broad class of N,N,N',N'-tetraalkyldiaminobenzophenones wherein the alkyl groups have from 1 to 6 carbons: N,N,N',N'-tetraethyl-4,4' diaminobenzophenone; N,N,N',N'-tetrapropyl-4,4'-diaminobenzophenone; N,N,N',N'-tetrabutyl-4,4' diaminobenzophenone; N,N,N',N' - tetraamyl - 4,4' diaminobenzophenone; and N,N,N',N' - tetrahexyl-4,4' diamonobenzophenone. These N-alkyl substituted aminobenzophenone derivatives are readily prepared from the corresponding substituted aniline by reaction with phosgene in a neutral solvent. More specifically one mole (99 grams) of phosgene is run into 4.3 moles of pure dry N,N' dialkylaminobenzene (e.g. dimethyl) with stirring, the temperature being maintained below 24° C. The acid chloride thus formed is further treated with zinc chloride whereby condensation takes place to form the ketone. The crude product is purified by dilute acid, separated by filtration, dried and recrystallized from kerosene. The alkylation of the aniline is readily accomplished using boron trifluoride according to the method of Dickey et al., United States Patent No. 2,391,139, issued December 18, 1945.

The dielectric materials which can be most effectively stabilized with the ketone class of the invention are the liquid hydrocarbons including both saturated and unsaturated. Included, then, is mineral oil which is a common term employed in the electrical components industry to designate any one of a number of hydrocarbon oils derived from petroleum. Many of these compositions are not in themselves a pure "fraction" containing only a single compound, but instead contain a plurality of different molecular ingredients; in addition, many of them melt above room temperature. Thus mineral oil, generally, is fully illustrative of the saturated hydrocarbon liquid dielectric. Extremely valuable dielectric impregnants illustrative of the unsaturated hydrocarbon type include polyisobutylene, the linear liquid polymer of isobutylene and normal butylene melting above room temperature, polybutadiene, and liquid polyalpha-methyl styrene. A further unsaturated liquid hydrocarbon is that described in the Robinson United States Patent No. 2,711,498, issued June 21, 1955, which dielectric consists essentially of an unsaturated linear hydrocarbon polymer of a mixture of mono-olefins having less than 12 carbon atoms with about from .5 to about 10% of diolefins, said unsaturated linear polymer having an iodine number between about 20 and about 70, as determined by Wijs' method, and having an average molecular weight between about 1200 and about 4200.

Reference should now be made to the appended drawing which shows a partly unwound capacitor in which the stabilized dielectric of the invention is used as the impregnant. This convolutely wound capacitor section consists of two electrode foils 12 and 14 separated by a dielectric spacer material 15. Such a capacitor section preferably consists of aluminum foil separated by a thin calendered kraft paper dielectric spacer material. Flat, flexible metallic electrically conducting tabs 16 and 17 are wound into the capacitor section so as to electrically contact the respective capacitor electrodes and so as to extend from the opposite ends of the section 10. The section which is impregnated after incorporation into a metallic housing of any of the well-known types, has its electrodes connected to the respective terminals of the housing by means of the tabs 16 and 17. The novel dielectric composition is introduced into the capacitor section by vacuum impregnation methods which are well-known to the art.

The new dielectric compositions obtained in accordance with the teachings of this specification contain from about .1% to about 10% by weight of a tetraalkyldiaminobenzophenone of the class set forth above. For best results under normal conditions the stabilizer is used in an amount from about 0.5% to about 5% by weight of the total weight of the composition.

A specific capacitor according to the present invention consists of two superimposed aluminum foils, 0.25 mil thick and ¾" wide, separated by three layers of 0.25 mil thick and 13/16" wide calendered kraft paper having a density of from about 0.97 to about 1.0. The capacitor unit was rated at 0.47 mfd. and 400 volts D.C. The impregnant consisting of 0.5% by weight of N,N,N',N'-tetramethyl-4,4' diaminobenzophenone admixed in the dielectric liquid of the said Robinson Patent No. 2,711,498, which dielectric consists essentially of the unsaturated linear hydrocarbon polymer of a mixture of isobutylene and about 5% by weight of butadiene-1,3, and has, resistivity of greater than 8000 megohms at 125° when measured in a 750 mmfds. Cardwell cell. Upon impregnation of this dielectric into the capacitor structure above by vacuum means, the capacitor showed a substantially improved life over units impregnated with the non-stabilized dielectric when both were subjected to an extended life test at 125° C. operating temperature.

Further examples indicative of the practice of this invention include dielectric systems impregnated into the above capacitor construction in which the respective dielectrics were as follows: (1) mineral oil having a viscosity of 500 cps. at 25° C. admixed with 0.1% by weight of N,N,N',N'-tetramethyl-4,4' diaminobenzophenone; (2) mineral oil having a flash point of 570° F. admixed with 10% by weight of N,N,N',N'-tetrahexyl-4,4' diaminobenzophenone; (3) liquid polyisobutylene having an average molecular weight of about 3000 admixed with 4% by weight of N,N,N',N'-tetraamyl-4,4' diaminobenzophenone; (4) liquid polyalphamethyl styrene having a viscosity of about 700–1000 centipoises at 60° C. admixed with 0.5% by weight of N,N,N',N'-tetramethyl-4,4'diaminobenzophenone. The compositions set forth hereabove which are representative of those coming within the scope of my invention are understood not to be limiting in nature, but merely illustrative of the true scope and breadth of my contribution to the art.

The stabilizers of the invention have been found to remarkably extend the operating lifetime of capacitors impregnated with saturated and unsaturated hydrocarbon dielectrics as compared to similar capacitors which do not contain such stabilizers. The use of my stabilizers overcomes the disadvantages of the prior art stabilizers which often reduce the resistivity of the dielectric to a value so low that they are no longer suitable for present day applications in electronic circuits. Further, the stabilizers of the invention are soluble to a high level in the dielectrics set forth above, so that there is no lack of solubility, a difficulty with otherwise effective prior art stabilizers. Further, the stabilizers of the present invention are of such molecular size as to have relatively low mobility so that they can accept conducting particles which would otherwise lead to substantial degradation of the dielectric, and upon acceptance retain such low mobility as to inhibit or prevent further electrical degradation.

As many apparently widely different embodiments of this invention may be made without departing from the spirit and scope hereof, it is to be understood that the invention is not limited to the specific embodiments hereof, except as defined in the appended claims.

I claim:

1. A capacitor having an assembly of electrodes and a porous spacer structure interposed between said electrodes and separating the electrodes and an impregnant in said assembly and between said electrodes of a liquid hydrocarbon dielectric providing resistivity in the porous spacer structure between the electrodes and containing from about 0.1 to 10% of a N,N,N',N'-tetraalkyl-4,4'-diaminobenzophenone in which the alkyl groups have from 1 to 6 carbon atoms of high solubility in the dielectric, said diaminobenzophenone having molecules of a size sufficient to maintain low mobility between said electrodes and to maintain the resistivity of the impregnant between said electrodes.

2. The capacitor of claim 1 in which the dielectric hydrocarbon is unsaturated, the alkyl groups are all methyls, and the tetraalkyl-diaminobenzophenone content is between about ½ and 5%.

References Cited in the file of this patent

UNITED STATES PATENTS

| | | |
|---|---|---|
| 2,176,952 | Berberich | Oct. 24, 1939 |
| 2,367,264 | Burk | Jan. 16, 1945 |
| 2,734,035 | Ross | Feb. 7, 1956 |